US010402780B2

(12) United States Patent
O'Sullivan et al.

(10) Patent No.: US 10,402,780 B2
(45) Date of Patent: Sep. 3, 2019

(54) SERVICE FOR RECEIVING OBSOLETE WEB PAGE COPIES

(75) Inventors: Patrick J. O'Sullivan, Dublin (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1409 days.

(21) Appl. No.: 12/102,207

(22) Filed: Apr. 14, 2008

(65) Prior Publication Data

US 2009/0259693 A1 Oct. 15, 2009

(51) Int. Cl.
*G06Q 10/10* (2012.01)
*G06F 16/27* (2019.01)
*G06F 15/16* (2006.01)

(52) U.S. Cl.
CPC ............ *G06Q 10/10* (2013.01); *G06F 16/27* (2019.01)

(58) Field of Classification Search
CPC .... G06F 17/30575; G06F 16/27; G06Q 10/10
USPC ............................. 707/624, 999.2, 999.204
See application file for complete search history.

(56) References Cited

U.S. PATENT DOCUMENTS

| | | | | |
|---|---|---|---|---|
| 6,182,133 B1 * | 1/2001 | Horvitz | ......................... | 709/223 |
| 6,351,767 B1 * | 2/2002 | Batchelder et al. | .......... | 711/118 |
| 6,694,335 B1 * | 2/2004 | Hopmann et al. | ............ | 707/624 |
| 6,925,515 B2 * | 8/2005 | Burns et al. | ................... | 707/201 |
| 7,072,911 B1 * | 7/2006 | Doman et al. | ................. | 707/624 |
| 7,178,097 B1 | 2/2007 | Talluri | | |
| 7,290,018 B2 * | 10/2007 | Muecklich et al. | .......... | 707/624 |
| 7,565,399 B1 * | 7/2009 | Goel | ............................. | 709/223 |
| 7,778,968 B2 * | 8/2010 | Cherry | ......................... | 707/624 |
| 2002/0120648 A1 * | 8/2002 | Ball et al. | ...................... | 715/234 |
| 2003/0041093 A1 * | 2/2003 | Yamane et al. | ............... | 709/223 |
| 2005/0108626 A1 | 5/2005 | Ong | | |
| 2007/0174324 A1 | 7/2007 | Palapudi et al. | | |

* cited by examiner

*Primary Examiner* — Usmaan Saeed
*Assistant Examiner* — Brian E. Weinrich
(74) *Attorney, Agent, or Firm* — Scully, Scott, Murphy & Presser, P.C.; Robert Shatto, Esq.

(57) ABSTRACT

The state of network-accessible information is preserved by recognizing a reference to a uniform resource locator contained within an electronic file where the uniform resource locator provides an address for content to be preserved. A copy of at least a portion of the information associated with the recognized uniform resource locator is obtained defining relevant content for preservation. A determination is also made as to whether the relevant content of the recognized uniform resource locator has changed since obtaining the copy of the relevant content. If a change is detected, an indication of the change is conveyed, e.g., to a corresponding user.

18 Claims, 6 Drawing Sheets

SERVICE FOR RECEIVING OBSOLETE WEB PAGE COPIES

BACKGROUND OF THE INVENTION

The present invention relates to systems, computer-implemented methods and computer program products for the archival and recovery of network-based information in a dynamic and changing environment.

It is becoming more and more common to cite or otherwise refer to web pages as source material in formal writings, such as scholarly works. It has also become common to reference web pages as source material in informal writings, such as emails, presentations, and other communications. In this regard, citations to a web page may be provided to acknowledge previous works, identify background or contextual information, direct readers to authoritative materials or otherwise provide additional content.

However, the Internet, and in particular, the World Wide Web (WWW) is dynamic in nature. As such, web pages may change over time, typically without notice. Accordingly, a link to the reference on the Internet may become broken such that the content is no longer available. Moreover, the link may remain valid, but the content itself may change or move. Thus, dependability issues must be considered with regard to the use of links to web pages in electronic documents.

Certain websites provide a notification service to alert subscribers to changes made to the content on the website. However, such systems are typically implemented so that users can see updated information in a timely fashion. If the desired material is the older material, then such a subscription is inadequate as the older, desired material has been changed. The Internet also hosts various archival sites that are intended to archive and preserve older web pages. However, such sites cannot be depended upon to accurately preserve specific content desired by a user. For example, there may be a time lag between the removal of desired web page content and its availability at the archival site. Moreover, the archival site may not store the appropriate version or all necessary corresponding links associated with a web page of interest.

A user may also make a private copy of one or more web page references. However, this can become administratively cumbersome, time consuming and unreliable, resulting in inconsistent storage of such content due to the largely manual form of content management required.

BRIEF SUMMARY OF THE INVENTION

According to various aspects of the present invention, a method of preserving the state of network-accessible information comprises recognizing a reference to a uniform resource locator contained within an electronic file where the uniform resource locator provides an address for content to be preserved. The method further comprises obtaining a copy of at least a portion of the information associated with the recognized uniform resource locator defining relevant content for preservation. The method still further comprises identifying whether the relevant content addressed by the recognized uniform resource locator has changed since obtaining the copy of the relevant content and conveying an indication if a change has been detected to the relevant content addressed by the recognized uniform resource locator.

According to further aspects of the present invention, a method of preserving the state of network-accessible information comprises recognizing by a preservation service, a reference to a uniform resource locator contained within an electronic file that addresses a web page having content for preservation, which is hosted by an associated web server. The method further comprises preparing a change for the web page associated with the recognized uniform resource locator and obtaining by the preservation service, a copy of at least a portion of the information associated with the recognized uniform resource locator defining relevant content to be preserved. The method still further comprises implementing the change for the web page and servicing the preservation request by conveying an indication of the change to a user based upon identified contact information of the user.

According to yet another aspect of the present invention, a method of preserving the state of referenced network-accessible information comprises providing a client for installation on a user processing device. The client is configured for identifying at least one uniform resource locator referenced in an electronic file, where each recognized uniform resource locator identifies the location of associated content that is desired to be preserved by the user. The client is further configured for obtaining a copy of the content of each recognized uniform resource locator, for storing the obtained copy of the content, receiving a request for the obtained copy and conveying the obtained copy to the user.

According to yet a further aspect of the present invention, a method of preserving the state of network-accessible information comprises obtaining a request for preservation of relevant content associated with a uniform resource locator, the request including at least a reference to the uniform resource locator and at least one item of user contact information. The method further comprises obtaining a copy of at least a portion of the information associated with the recognized uniform resource locator responsive to the request. The method still further comprises determining whether the at least a portion of the recognized uniform resource locator has changed, at least since obtaining the copy of at least a portion of the information and conveying an indication if a change has been detected to the relevant content of the recognized uniform resource locator.

According to a further aspect of the present invention a computer program product is provided for preserving the state of network-accessible information. The computer program product comprises a computer usable medium having computer usable program code embodied therewith. Moreover, the computer usable program code comprises computer usable program code configured to recognize a reference to a uniform resource locator in an electronic file where the uniform resource locator provides an address for content to be preserved. The computer program product further comprises computer usable program code configured to obtain a copy of at least a portion of the information associated with the recognized uniform resource locator defining relevant content for preservation. The computer program product further comprises computer usable program code configured to identify whether the relevant content of the recognized uniform resource locator has changed since obtaining the copy of the relevant content and computer usable program code configured to convey an indication if a change has been detected to the relevant content of the recognized uniform resource locator.

According to yet another aspect of the present invention, a system to preserve the state of network-accessible information comprises a first processing device coupled to a network having software code thereon configured for recognizing a reference to a uniform resource locator in an electronic file where the uniform resource locator provides an address for content to be preserved. The system further comprises a storage device coupled to the first processing device, wherein the storage device stores a copy of at least a portion of the information associated with the recognized uniform resource locator defining relevant content for preservation that has been obtained by the first processor and a monitoring component executed on the first processing device for identifying whether the relevant content of the recognized uniform resource locator has changed since obtaining the copy of the relevant content, wherein an indication is conveyed if a change has been detected to the relevant content of the recognized uniform resource locator.

DETAILED DESCRIPTION OF THE INVENTION

According to various aspects of the present invention, methods, computer program products and systems are provided for implementing content preservation of network-accessible information.

As will be described in greater detail herein, the state of network-accessible information is preserved according to various aspects of the present invention, by recognizing a reference to a uniform resource locator (URL) in an electronic file, where the URL addresses content to be preserved that is accessible over a network.

The reference to the URL may be recognized in numerous ways, a few illustrative examples of which include receiving a preservation request that identifies the URL and optionally contact information of a corresponding user. The reference to the URL may also be identified by scanning or otherwise evaluating electronic files to identify URLs within the scanned files. A copy of at least a portion of the information associated with the recognized URL is obtained defining relevant content for preservation. For example, the preservation service may filter out advertisements and other non-relevant information from the obtained content at the identified URL. The relevant content may also require the capture of information that is referenced or otherwise linked to in the identified URLs. Various examples of content selection are described more fully herein.

If the relevant content of the recognized URL has changed since obtaining the copy of the relevant content, then an indication of the change is conveyed. The conveyance of the indication may comprise alerting a user of the change. The indication may alternatively comprise providing the copy of the relevant content to a corresponding user. Various aspects of the present invention are described in greater detail herein.

Regardless of whether the content is preserved at the time of receipt of the notification by the preservation service or at the time of change to the content itself, the content at an associated URL is preserved at a user-defined state. Thus, a user may reference a link, and obtain a copy of the material when and if the linked content becomes no longer available across the network. According to various aspects of the present invention, if the link remains available and if the content at the link does not change, then the user may not require or desire a copy of the content.

Figure 1:
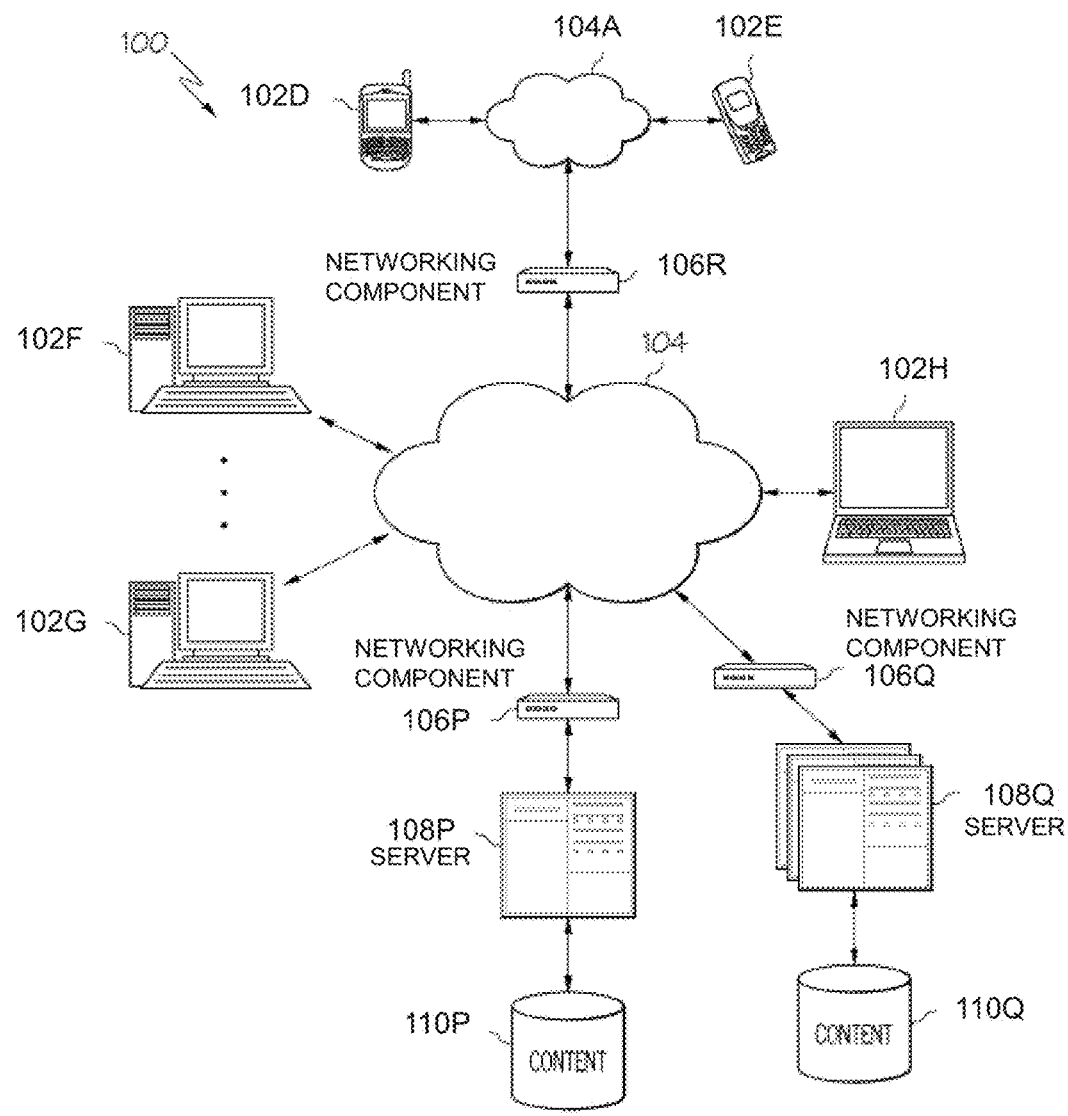
FIG. 1 is a schematic illustration of an exemplary computing system that supports dynamically changing network-accessible content as well as the capability for information preservation according to various aspects of the present invention.

Referring now to the drawings and particularly to FIG. 1, a general diagram of a computer system 100 is illustrated, which may be utilized to preserve content according to various aspects of the present invention. The computer system 100 comprises a plurality of hardware and/or software processing devices, designated generally by the references 102A-102H in the figures, with only 102D-102H shown in FIG. 1, that are linked together by a network 104 or 104A. Typical processing devices 102A-102H may include servers, personal computers, notebook computers, transactional systems, purpose-driven appliances, pervasive computing devices such as a personal data assistant (PDA), palm computers, cellular access processing devices, special purpose computing devices and/or other devices capable of communicating over the network 104 or 104A. The processing devices 102A-102H may also comprise software, including applications and servers that process information stored in various databases, spreadsheets, structured documents, unstructured documents and/or other files containing information.

The network 104, for example, provides communications links between the various processing devices 102, and may be supported by networking components 106A-106R (with only 106P-106R shown in FIG. 1) that interconnect the processing devices 102D-102H, including for example, routers, hubs, firewalls, network interfaces, wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102D-102H, in either real time or otherwise, e.g., via time shifting, batch processing, etc.

The illustrative system 100 also includes a plurality of servers 108A and 108Q (with only 108P and 108Q shown in FIG. 1), e.g., web servers, file servers, dedicated networked storage devices and/or other processing devices that store or otherwise manage information such as network-retrievable web pages in data sources 110A-110Q (with only 110P and 110Q shown in FIG. 1). Conventional web browsers may be executed on the various processing devices 102D-102H to retrieve desired content from the network 104, such as by identifying to the corresponding server (e.g., 108P), a unique URL for the associated content stored in the data source(s) 110P (or 110Q for the server 108Q). The system 100 is shown by way of illustration, and not by way of limitation, as a computing environment in which various aspects of the present invention may be practiced.

As used herein, the term universal resource locator (URL) is to be interpreted broadly to encompass information that identifies the location of particular network-accessible electronic files across the network 104. For example, a URL may be used to reference a web page that is maintained within a data source 110P of a corresponding one of the server 108P.

As used herein, the term "web page" should be interpreted expansively to include one or more Web resources that are referenced by a single URL. We pages are typically comprised of content that is rendered by a corresponding web browser as a single unit, e.g., generally at the same time. A web page may consist of one or more hypertext markup language (HTML) documents, one or more non-HTML documents or any combination thereof. Thus, a web page may include non-HTML documents such as image, audio, video and other media files, portable data format (pdf) files, structured and unstructured documents, executable files such as common gateway interface applications, Java applets, etc., metadata and other types of content. In this regard, various components of a Web page may reside at different network locations. The location of the Web page, however, is determined by the URL identifying the page.

The network 104, e.g., which may connect to the Word Wide Web portion of the Internet, enables access to a vast amount of content. However, this content may be dynamic and change over time. Thus, a user typically cannot be assured that the state of the content at a particular URL will be identical each time that URL is retrieved. However, there are times where a user may desire the ability to preserve the state of certain content that may be addressed by a URL.

As noted above, various processing devices 102D-102H may execute Web browsers that allow for the retrieval of network-accessible content. However, due to the dynamic nature of Web content, a Web document may not be considered a reliable reference source. For example, Web content can dynamically change, often without notice to a corresponding user that had previously visited the corresponding website.

It is not uncommon for a user to have numerous electronic files stored on their corresponding processing device 102D-102H, e.g., a personal computer that contains URLs therein. These files may be email messages, presentation files, word processing documents, structured documents such as spreadsheets and/or databases, etc. According to various aspects of the present invention, the URLs referenced in electronic files are managed such that the user has knowledge of when the relevant content at a corresponding URL has changed. The user may also access a copy of the pre-modified content to preserve the information therein. In this regard, various aspects of the present invention may provide a mechanism to retain the version or state of content despite the dynamic and changing nature of the Internet. Moreover, a backup and archival is provided for content, e.g., Web pages referenced by URLs that are maintained "externally" to the corresponding processing device.

According to various aspects of the present invention, the preservation of network accessible content may be performed by or in cooperation with a "preservation service". The term "preservation service" should be interpreted broadly to include for example, executable code and optionally corresponding data that may be executed on a user computer, on a server computer or other processing device or the preservation service may be distributed across multiple computing devices to perform the content preservation functions as described more fully herein. Various examples of preservation service implementations are set out more fully herein.

Figure 2:
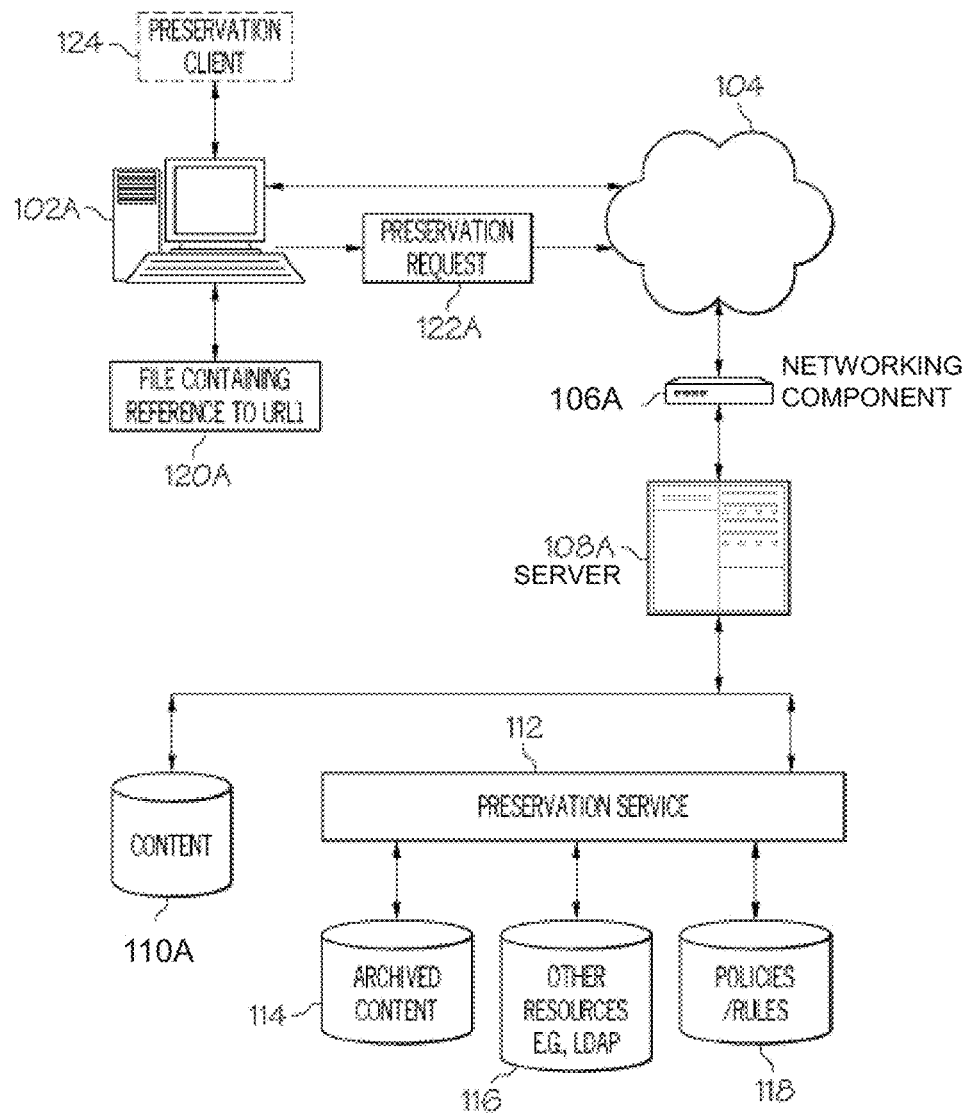
FIG. 2 is a block diagram of a server that provides content preservation according to various aspects of the present invention.

Referring to FIG. 2, content preservation may be implemented by a server according to various aspects of the present invention. The server, further designated 108A, executes a preservation service 112. The preservation service 112 may utilize archive storage 114, which is also referred to herein as a content management repository, to store user-defined content as will be described in greater detail below. The preservation service 112 may also utilize one or more resources 116, such as a Lightweight directory Access Protocol (LDAP) service or other type of directory service and/or one or more policies and/or rules, which may be stored in one or more databases 118 as will be described in greater detail herein.

As an example of operation, assume that a user operating a first processing device, further designated 102A, references a URL in an email, a document or other electronic file 120A and may thus wish to preserve the state of that information. Further, assume that the referenced URL identifies the location of the content as residing within the data source 110A that is managed by the first web server 108A. A first preservation request 122A is communicated from the first processing device 102A to the first web server 108A or otherwise to the preservation service 112. As such, at least conceptually, the preservation request 122A serves as a subscription to the preservation service 112 for preserving the state of network-accessible information that is located at the identified URL. The first preservation request 122A identifies the referenced uniform resource locator that is to be preserved and may further identify contact information associated with the preservation request, e.g., such as may be necessary where the preservation service 112 is incapable of figuring out suitable contact information itself. Moreover, the preservation request 122A may be communicated in any practical way so long as the preservation service 112 can understand and interpret the received request.

The first preservation request 122A and other such preservation requests may be made manually by the user. For example, the user may utilize email, a connection to a web page/portal or other suitable electronic communication technique to communicate the preservation request 122A to the preservation service 112. As another example, user interaction may drive the generation of the preservation request. For example, a user may select a command within the application hosting the electronic file containing the referenced URL. For example, an email program may include a command button that may be executed by the user to trigger the generation of the preservation request.

As yet another example, the preservation request 122A may be programmatically implemented. For example, an automatic process may detect the reference to the URL and automatically generate and send the preservation request 122A. In this regard, the programmatic action may be implemented by an application associated with the electronic file containing the URL reference. For example, an email program may detect the URL message in the message body of a corresponding email and prepare and optionally communicate the preservation request 122A. A word processing application may detect a URL in the body of a corresponding word processing document and prepare and communicate the preservation request 122A, etc.

As yet another example, a preservation client 124 may reside on processing device 102 operated by the user. The preservation client 124 may be configured to automatically scan electronic files for referenced URLs or the user may manually trigger the preservation client 124 to generate and communicate the preservation request. Still further, a preservation client 124 may be provided as a plug-in or hook to a corresponding host application, such as an email, web browser, presentation program, word processor, etc. The preservation client 124 may thus be installed on the user processing device and is configured for identifying references to uniform resource locators in electronic files associated with the user processing device. The preservation client 124 may further be configured for performing at least one of formatting preservation requests or sending preservation requests to the intermediate server.

As yet another example, the server 108A hosting the preservation service 112 may be collocated with an application server such as an email server utilized by a user. As such, the preservation service 112 may be able to recognize references to URLs in electronic files maintained by the application server, such as by scanning the electronic files. As an illustrative example, a service provider may control the server 108A to provide Internet accessible e-mail services utilized by a user and may also provide the preservation service 112.

Thus, the preservation service 112 recognizes a reference to a URL contained within an electronic file where the URL provides an address for content to be preserved. In this regard, the recognition of the reference to the URL may be derived from receiving a preservation request 122A, or by otherwise discovering the URL in the electronic document, such as by scanning electronic files, etc.

Moreover, the electronic file containing the URL may be any file that is network-accessible by either the processing device 102 and/or the preservation service 112. Similarly, any accessible storage location may be evaluated for containing electronic files containing URLs whose content is desired to be preserved, including for example, local storage, network accessible storage devices and on-line storage, e.g., a third party Internet e-mail or Internet based file sharing repositories.

When the preservation service 112 recognizes the reference to the URL, e.g., via the preservation request 122A from processing device 102A, appropriate work flow is implemented to facilitate preservation of the requested URL. In the illustrative example of FIG. 2, the URL may address a web page hosted by a corresponding web server for preservation, which is also executed on server 108A. As such, the preservation service 112 may be self-aware of updates and/or have notice of when updates are serviced by either the web server 108A or the preservation service 112. Under this arrangement, the workflow may require no action on the part of the preservation service 112 until an update of the web page corresponding to the URL in the corresponding preservation request 122A is to be implemented. If preparing a change for the web page associated with the recognized URL, the preservation service 112 may detect the update. Accordingly, the preservation service may obtain a copy of at least a portion of the information associated with the recognized uniform resource locator defining relevant content to be preserved. The changes to the web page may be implemented as the preservation service 112 has copied at least the relevant content. The preservation service 112 then services the preservation request 122A by conveying an indication of the change to a user based upon identified contact information of the user. As an illustrative example, the preservation service 112 may communicate a copy of the unmodified web page or the determined relevant content thereof, to the contact address specified in the preservation request 122A. Alternatively, if the pre-modified content has been archived in a suitable storage location that is accessible to the processing device 102A or a user associated with the processing device 102A, then the indication may include information necessary for the user to retrieve the pre-modified content from the storage.

Alternatively, upon receiving the preservation request 122A, the preservation service 112 may archive a copy of at least the relevant content of the specified URL content in the archived content storage 114 if utilized. For example, the preservation service 112 may store the obtained copy of at least the relevant content of the identified uniform resource locator within the content management repository to create a pre-modified copy of the relevant content in a manner that associates the stored content with the identified contact information. In this regard, the relevant content may comprise an entire web page. As a further example, the relevant content may include the content of the webpage, but not the associated metadata. As another example, the relevant content may include content that is not in banners, advertisements, or other identifiable components of a given webpage. As still further examples, the relevant content may include not only the Web page content but also the content of corresponding information that is linked-to by the Web page, etc. The portion of the information addressed by a corresponding URL may be determined by receiving from a user, an indication 121 of the portion of the recognized URL that defines relevant content. At least one predefined rule or policy may also be specified to distinguish relevant content from a remainder of content associated with the recognized URL.

If the preservation service 112 is not self-aware of updates to the content of corresponding preserved Web pages, the preservation service 112 may obtain a copy of the relevant content of a recognized URL, e.g., which may be stored in the archived content 114. The preservation service 112 may also monitor the content, e.g., implement a monitoring component, to determine whether changes have occurred by polling or by subscribing to changes on the individual web pages if monitored by other resources. Still further, an autonomous processing device in data communication with the network 104 can periodically examine identified URLs, e.g., by waking up at prescribed times to perform a series of evaluations across the network 104.

Thus, according to various aspects of the present invention, the preservation service 112 monitors the identified URL, determines whether the relevant content of the monitored uniform resource locator has changed since receiving the corresponding preservation request 122A and conveys a change indication to the contact identified by the contact information if the relevant content at the monitored URL has changed. The change indication may comprise at least one of a copy of the pre-modified content or a location where the pre-modified content can be retrieved from the content management repository.

As such, users may subscribe to network-accessible content, and may further obtain a copy of that content if it becomes necessary in order to preserve it. That is, a user may reference a link in an electronic file and have that reference trigger appropriate action to subscribe to the content specified by the link. The user may then obtain a copy of the material, e.g., the pre-modified content, when and if it becomes no longer available on line.

The notification provided by the preservation request 122A may contain contact information associated with the user. In this regard, the contact information may be specified in any practical way that allows the preservation service 112 to associate subscribed-to links (URLs) and corresponding web pages with the user that initiated the preservation request. The contact information may thus include an internet address, an email address or other identification information. The preservation service 112 may also utilize an LDAP or other directory service identified in the data resource 116 to aid in locating subscribers.

In certain instances, permanent archival of information is not required. Rather, a subscriber may have a predefined retention period in which it is necessary to preserve the information, after which it is no longer necessary to preserve the content.

As such, the preservation service 112 may utilize one or more rules or policies to determine whether a subscribed to link should be continued to be monitored. Such rule or policies may be associated with a corresponding application that hosts the electronic file containing the URL. For example, a first retention policy may be determined for links located in email and a second retention policy may be determined for links in word processing documents. Further levels of organization and policy may further be implemented. For example, certain types of word documents may contain links that are to be preserved indefinitely, while other word processing documents may include links that are to be preserved for pre-defined durations. Rules for retention may also be determined based upon an individual user, a department or an enterprise.

Thus, as an example, a user may subscribe to a particular link and specify that the preservation requirements are necessary for a specified duration. As such, the preservation service 112 will monitor the particular link for the specified period. If the content of a particular link does not change over that specified period, then no further action may be taken. Upon expiration of the specified period, the subscription may conceptually be considered expired and no further monitoring may be performed.

On the other hand, if the content at the particular link changes within the specified period, then the preservation service may for example, send a copy of the subscribed to content to the user as described more fully herein.

Thus, at least one policy may set an expiration after which the preservation service 112 will no longer monitor the recognized URL based upon at least one characteristic of an application e.g., based upon a durational period specific to the corresponding application and/or the electronic file 120A. As a few examples, expirations may be defined based upon at least one characteristic of an email application, at least one characteristic of a word processing application or at least one characteristic of a presentation application. As an illustrative example, an email application may include the capability of setting retention policies for individual items or folders, as in Lotus Notes by International Business Machines of Armonk, N.Y. Thus, the retention of the preserved URL content may be linked to or otherwise correspond with retention of the source electronic file that contains the URL to the preserved content. In the above example, a preserved URL would inherit the preservation characteristics of the email that contains the URL.

As noted above, in certain instances, information at a specific URL may comprise content that is of interest, and content that is not of interest. The user may not desire to have an indication, e.g., a notification or a copy of the URL sent if only the non-relevant content is changed. For example, a given web page may be a dynamic page such that each visit to a specific URL may return different content. These dynamic changes may be the result of advertisement banners that change, streaming media such as from WebCast events, tickers audio streams, changes caused by the execution of applications such as Javascripts, etc. As such, the rules and policies may also specify filters to screen the detection of change to specific portions of the web page content, e.g., specific text portions of a corresponding web page. As another example, a user may specify a profile that defines certain text within a URL as being of interest. If changes are detected to the profiled text, then an indication is conveyed to the user, e.g., a copy of the pre-modified content, a notification that the content has changed, etc.

Figure 3:
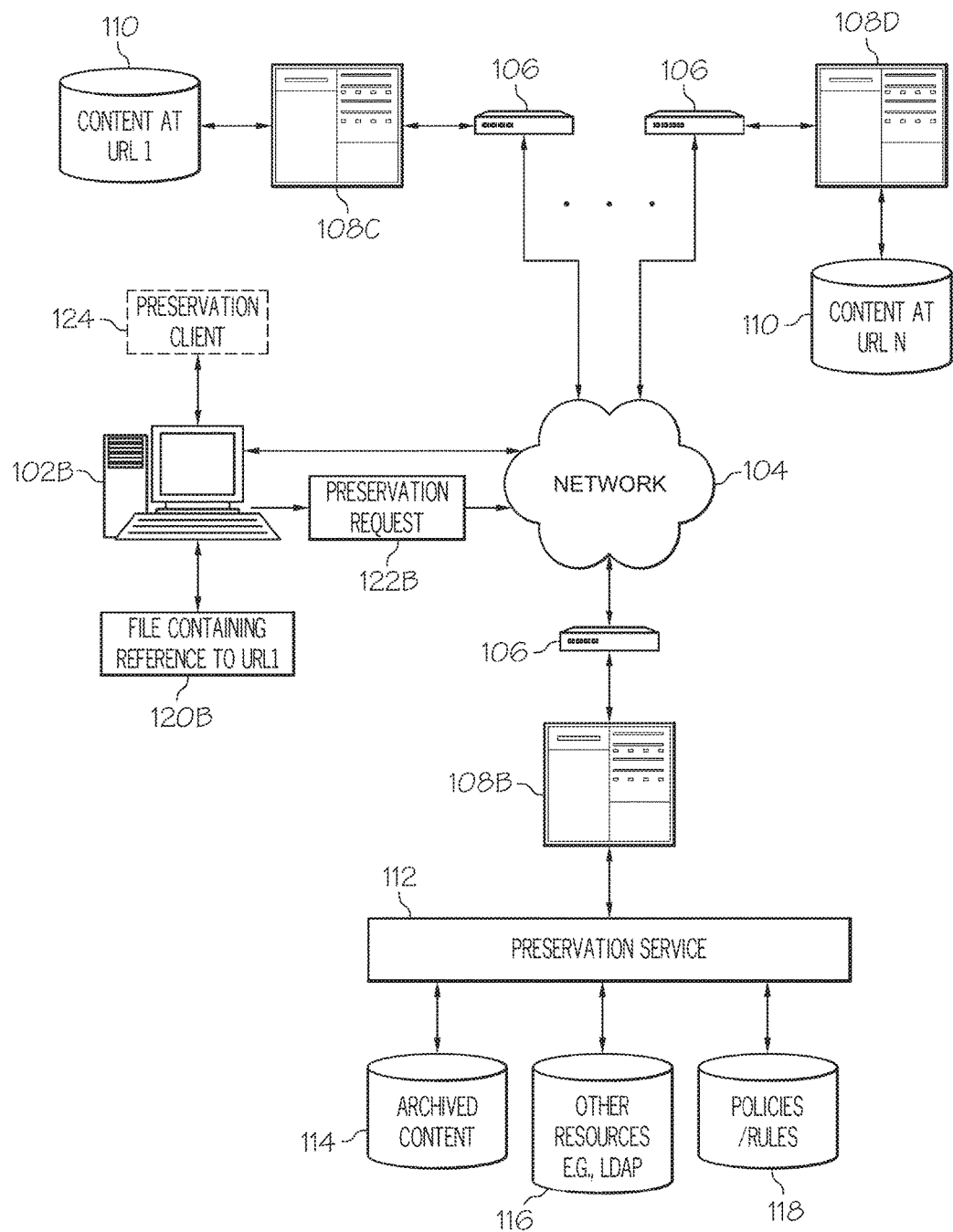
FIG. 3 is a block diagram of a preservation service that provides content preservation according to various aspects of the present invention.

Referring to FIG. 3, the preservation service 112 need not execute on the same server 108C (or system) that hosts the corresponding monitored content. For example, the preservation service 112 may be hosted by a preservation server 108B. In this regard the preservation server 108B may be functioning as a third party preservation service. The preservation server 108B may also itself be a web server and host network-accessible content if so desired. In this regard, the features described above with regard to the preservation service 112 described with reference to FIG. 2 apply similarly to the preservation service 112 illustrated in FIG. 3.

In the illustrated exemplary configuration, a user at a processing device 102B references a URL in an electronic file 120B, thus triggering a preservation request 122B to be communicated to the preservation service 112 executed on preservation server 108B. In the illustrated configuration, the preservation service 112 may be a third party service. As such, the preservation service 112 obtains a copy of the subscribed-to content and stores that copy in the archived content storage 114. For example, the preservation service 112 may access one or more remote servers 108C, 108D, etc. to retrieve and archive the user-specified content. The preservation service 112 then preserves the content if required, e.g., based upon specified rules and/or policies as described more fully herein.

Moreover, the preservation service 112 may monitor the web pages that it has archived to determine whether any changes have been implemented. Monitoring may be performed by polling, by subscribing to changes on the individual web pages or by using other suitable techniques. If a change is detected, the preservation service 112 may electronically communicate the archived content to the user at processing device 102B. The preservation service 112 thus obtains a copy of at least a portion of the information associated with the recognized URL defining relevant content for preservation, identifies whether the relevant content of the recognized uniform resource locator has changed since obtaining the copy of the relevant content and conveys an indication if a change has been detected to the relevant content of the recognized URL.

As noted in greater detail herein, resources 116, such as LDAP and/or other directory services may be used to locate the subscriber-users. Moreover, policies and rules 118 may be utilized to specify content of interest within a given URL, e.g., to filter banner advertisements, etc. and/or to set limits on the archival period. For example, the content may be archived for a predefined duration, after which the subscription is considered expired and the content deleted. As another example, the expiration of the subscription may trigger the preservation service 112 to stop monitoring an associated URL for changes. However, the archived content may be preserved. Various alternative rule and policy implementations may also be realized.

When a change is prepared for the web page, the notification request is serviced, such as by communicating a copy of the subscribed to content to the user. Since the preservation service is provided by a third party service, any number of users across one or more enterprises can subscribe to URLs through the service 112.

An enterprise implementation may employ an intermediate server to act as a preservation service 112. Accordingly, when a URL is referenced by a user on a corresponding processing device 102B, e.g., from within an email, word processing or presentation application, an indication of the URL is provided to the preservation service 112, which obtains a copy of the relevant URL content. The obtained copy is suitably stored, such as in a corresponding content management repository 114. This content can be preserved by the content management repository indefinitely as an archives Alternatively, the cached content may be preserved in accordance with the policy, such as a retention policy specified for the email or other application. Similar actions can be taken by other applications such as presentation preparation applications. As a further example, the third party preservation service 112 may be integrated with or otherwise associated with other third party services. As an illustrative example, many users take advantage of web-based email services so that email messages can be accessed regardless of location, including over public network systems. The preservation service 112 can interact with such web-based email services to scan the user's emails for references to links, and to preserve those links in a subscription list. The above may similarly be implemented with Internet services that host electronic file storage and hosting facilities to preserve referenced URLs contained in the hosted electronic files.

As a further example, the third party preservation service 112 may be integrated with or otherwise associated with other third party services. As an illustrative example, many users take advantage of web-based email services so that email messages can be accessed regardless of location, including over public network systems. The preservation service 112 can interact with such web-based email services to scan the user's emails for references to links, and to preserve those links in a subscription list. The above may similarly be implemented with Internet services that host electronic file storage and hosting facilities to preserve referenced URLs contained in the hosted electronic files.

Still further, a preservation client 124 may be installed on a processing device that is connected to the network 104, where the preservation client 124 is configured for identifying references to URLs in electronic files associated with the corresponding processing device 102B. The preservation client 124 is further configured for performing at least one of formatting preservation requests or sending preservation requests to the intermediate server.

Figure 4:
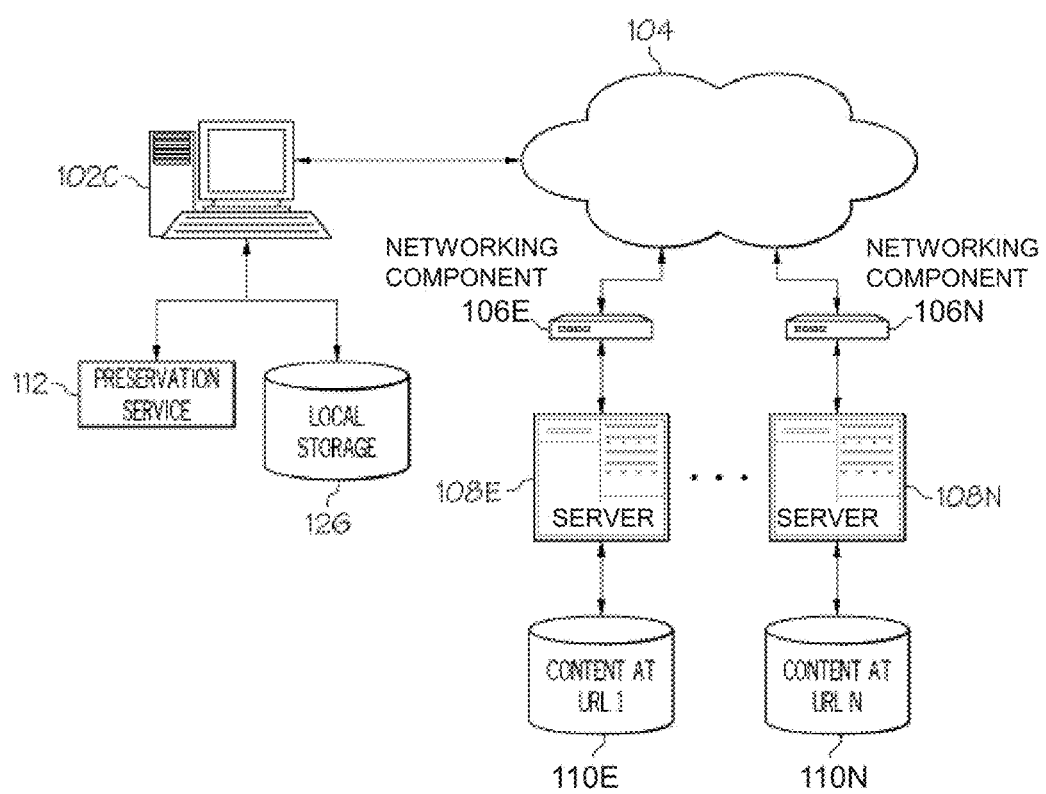
FIG. 4 is a block diagram of a system where a client operating on a local processing device provides content preservation according to various aspects of the present invention.

Referring to FIG. 4, as yet another exemplary implementation, the preservation service 112 may be implemented locally on the user's processing device 102C. As an illustrative example, as shown, a processing device 102C executes the preservation service 112, e.g., as a suitable client, which detects references to URLs. In this regard, the preservation client may include hooks into existing application, such as one or more hooks into email programs, word processing programs, presentation preparation programs, etc. The preservation client may also scan or otherwise identify URLs in electronic files accessible to the processing device 102C. If a URL is detected as being referenced, the preservation client obtains the content specified by the URL by accessing the appropriate server 108E, 108N to obtain the corresponding content from server storage 110E-110N. The retrieved content is stored in the local storage 126 of the processing device 102C. That is, the preservation service 112C identifies URLs of interest to the corresponding user, and takes the necessary steps to preserve the content of interest to the user. When the user accesses a subscribed to URL, the preservation service 112A may determine whether the contents of the web page have changed. If the content has been updated, e.g., as may be modified by rules, policies, etc., the user may be so notified, e.g., using a suitable dialog box. The user may then decide to view the current, modified content, or to view the pre-modified content that has been cached by the preservation service 112.

When the user accesses a subscribed-to URL, the preservation service 112A may determine whether the contents of the web page have changed. If the content has been updated, e.g., as may be modified by rules, policies, etc., the user may be so notified, e.g., using a suitable dialog box. The user may then decide to view the current, modified content, or to view the pre-modified content that has been cached by the preservation service 112.

Figure 5:
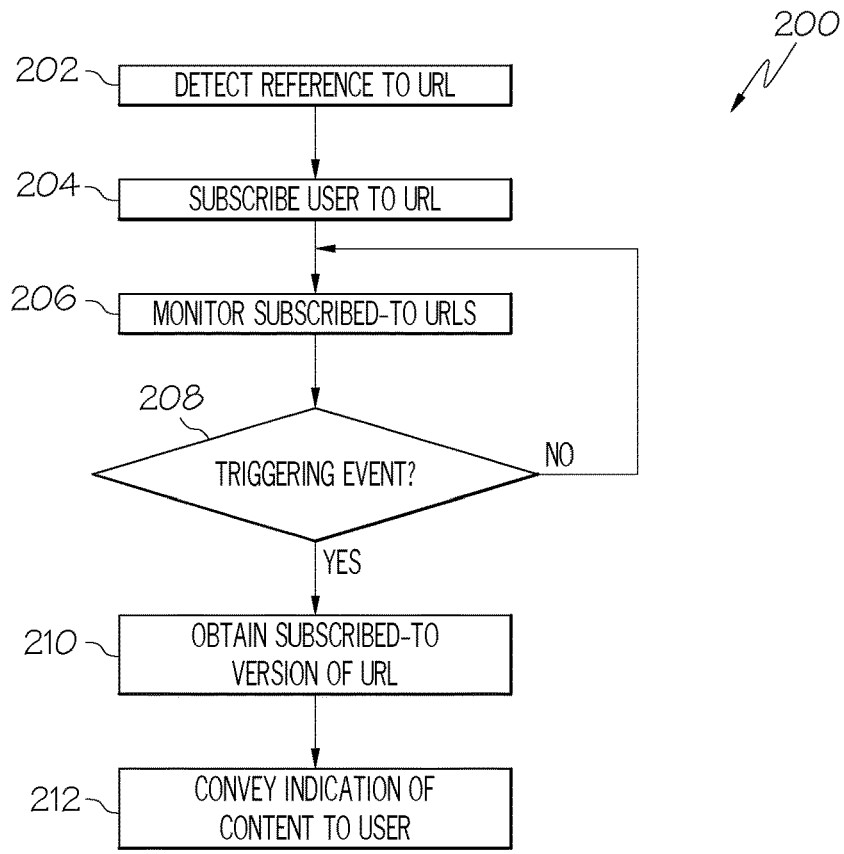
FIG. 5 is a flow chart of a method of preserving information stored on a network according to various aspects of the present invention.

Referring to FIG. 5, a method 200 is illustrated for preserving information specified by a URL. The method 200 may be implemented by the various configurations described above with reference to FIGS. 1-4. Initially, a reference to a URL is detected at 202 and the URL is subscribed to at 204. These processes may be implemented automatically, such as by a preservation service 112C operating on the user processing device 102A-102H, by a preservation client 124 working in cooperation with a remote preservation service 112, by a user formatting manually creating a preservation request to a remote preservation service 112, etc.

The subscribed-to URLs are monitored at 206, e.g., using a suitable monitoring component. If a triggering event is not detected at 208, then the method continues to monitor the subscribed-to URLs. If a triggering event is detected at 208, then a subscribed-to version of the content of the corresponding URL is obtained at 210 and an indication of the pre-modified content is conveyed to the user at 212. The indication of the pre-modified content may include, for example, a copy of the content itself. Alternatively, if the pre-modified content has been archived in a suitable storage location, then the indication may include information necessary for the user to retrieve the pre-modified content from the storage. This further provides a notice function to the user so that the user knows that the content at the subscribed-to URL has changed.

As noted in greater detail herein, the triggering event may comprise detecting a change in the content. The detection of a change to the content may require implementing filters, policies and rules to differentiate content of interest from non-relevant content at a given URL. For example, a user may not want to be notified if the only changes at the URL are to banners, advertisements, etc. Moreover, the monitoring may require following links in the content at the URL, if such links and their content are considered part of the relevant content to be monitored. As another example, it may be desirable to a user to capture a web page if the content of a linked-to page changes, even if the web content addressed directly by the corresponding URL does not change. Additionally, obtaining the subscribed-to version of the URL at 210 may comprise obtaining the content from the source web server 108, or the desired content may be extracted from a local or remote archive 114. Alternately, obtaining of the desired content may be implemented by the preservation service before the triggering event.

Figure 6:
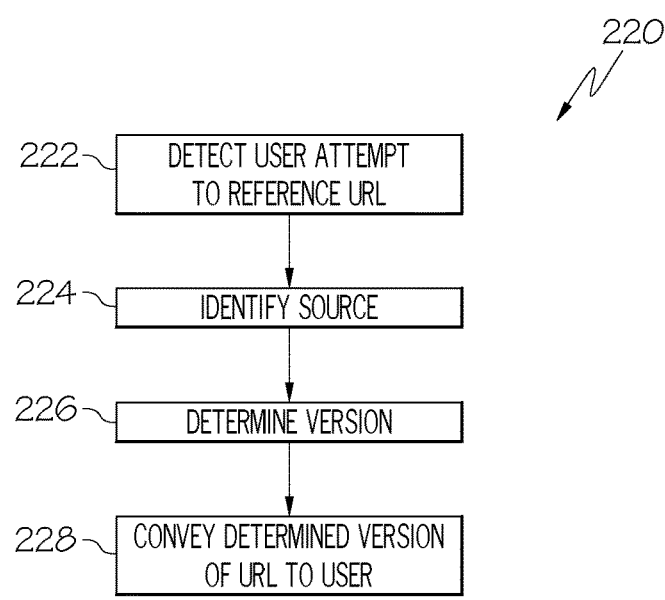
FIG. 6 is a flow chart of a method of retrieving information stored on a network according to various aspects of the present invention.

Referring to FIG. 6, a method 220 illustrates a method of determining a version of a URL desired by a user, where the content has been previously identified to a preservation service as described more fully herein. Initially, a user attempt to reference a URL is detected at 222, and the source is identified at 224 from where the user is attempting to reference the URL. In this regard, the user may typically access URLs from different applications and/or mechanisms. For example, if the user executes a web browsing software application, then the user may want to see the version of a URL as it exists on the Internet in its current form. If however, the user double clicks or otherwise attempts to activate the URL link in the referenced electronic file that triggered the subscription e.g., the email program, presentation software, word processing software, etc., then the user may be intending to see the content as it exists as managed by the preservation service. As such, the determined version of the URL is conveyed to the user at 228, e.g., from the URL location as the content currently exists, or from the preservation service as it was archived. The system may also tag the content or otherwise identify to the user that the content is not the current version of the content, but is rather being served from an archive to provide subscribed-to pre-modified version of the content.

As yet another example, if a user attempts to access a URL, a check may be conducted to determine whether the specified URL is one to which the user is currently subscribing to. If the user is currently subscribing to the URL, and if there have been detected relevant changes to the URL, a prompt or message may ask the user whether the original subscribed to/pre-modified version of the information, or the current version is desired. If the user wants the current version of the URL, then the user obtains the URL content in a conventional manner. If the user selects the previously preserved version, then the preservation service provides the content to the user. Still further, where more than one version has been archived, the user may have an option of which state of the URL is desired for viewing.

According to various aspects of the present invention, the preservation service may comprise an enterprise application that collects, manages and distributes preservation information for a community of users. For example, in practice, the preservation service may be deployed across multiple servers through both vertical and horizontal scaling. In general terms, each user of the preservation service may support a "subscription list" or other logical organizations that identifies URLs to be monitored on behalf of that user. As an illustrative example, the preservation service may preserve the URLs identified by a corresponding user. If the user is executing an application that deploys a link to a URL identified by the user for preservation, e.g., the user clicks on a link to an identified URL in an email application, the preservation service may inform the user if there has been a change. Thus the user need not know of the change before clicking on the link. Under this arrangement, the preservation service may provide the user the opportunity to retrieve a copy of the preserved URL, e.g., from the content management repository 114 or the user may desire to see the current state of the content as addressed by the URL.

The preservation service may also provide publication and/or notification of preservation information so that each user receives notifications of changes to the URLs that are identified on their subscription list, at least by virtue of receiving a copy of the content URL. As yet a further example, in an implementation where the preservation service is operated by an enterprise, there may not be a need to associate a user and corresponding notification with changed URLs. Rather, the preservation service may simply preserve all referenced URLs detected in electronic files deployed across the enterprise.

The overall performance of the preservation service is affected by how well the preservation service scales up to include more and/or to handle larger subscription bases/quantity of preservation information traffic for its existing members. For example, the preservation service may maintain preservation information comprising a URL that is included in an email that is distributed to numerous recipients, e.g., a reference to a policy within a large corporation. A change in the content of that URL may thus trigger the preservation service to update the change status of that URL to all associated subscribing members, which may be every recipient of the corresponding email. Accordingly, the change in status of a single URL may require numerous messages to be generated, depending upon how many members subscribe to the URL whose status has changed.

In the various exemplary configurations described herein, e.g., the preservation service 112 operating at local level on the user's processing device, as a third party service, or on the web server system hosting the content, the user's subscription request causes a workflow to trigger wherein a designated URL is either monitored for changes, or the pre-modified content of the URL is archived for preservation. The information that is captured and archived may be configured to account for the various types of content available across the network 104. As a few illustrative examples, in order to capture the pre-modified content of a URL, the preservation service may retrieve and store a snapshot of the corresponding URL. This may require that links contained within the content of the specified URL be followed and also retrieved. Alternatively, link constraints may be implemented to limit the retrieved content. For example, the archived links may be limited based upon the domain of the link, based upon the content type or any other desired factor.

Still further, the triggering event used to define a change in the content may be controllable, e.g., to limit the necessity of performing a notification to the user when a change has been detected in the content of a web page that is linked-to by a subscribed URL. Thus, link change notification constraints may be imposed by the preservation service 112. Alternatively, the linked-to content may be deemed just as relevant as the content directly within a given web page. Under such an arrangement, it may be desirable to not implement constraints on link change notifications.

As still a further option, the preservation service may archive "versions" of the content specified by a designated URL based upon a preservation request designating a corresponding URL.

Figure 7:
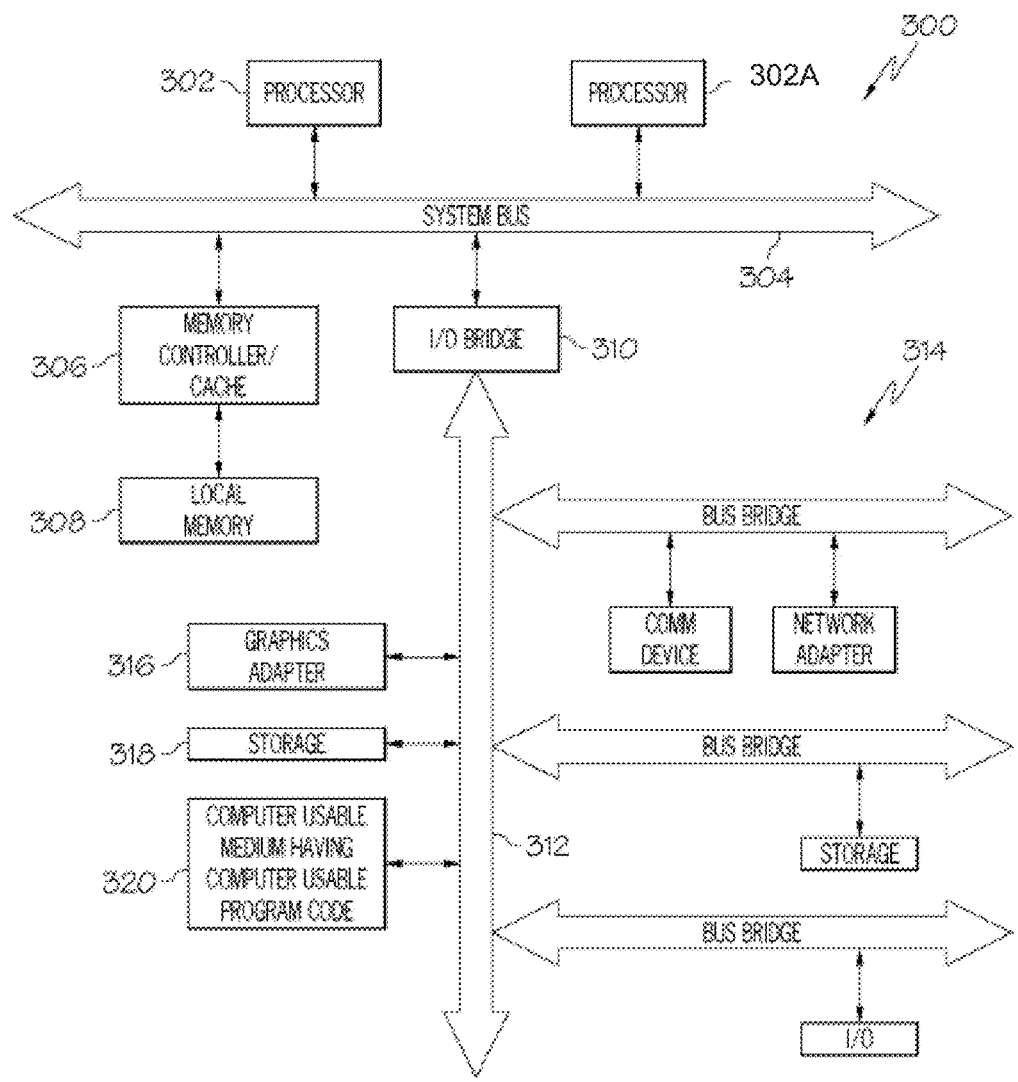
FIG. 7 is a block diagram of an exemplary computer system including a computer usable medium having computer usable program code embodied therewith, where the exemplary computer system is capable of executing a computer program product to preserve and/or retrieve network-accessible content including web pages according to various aspects of the present invention.

Referring to FIG. 7, a block diagram of a data processing system is depicted in accordance with the present invention. Data processing system 300, such as one of the processing devices 102 described with reference to FIG. 1, may comprise a symmetric multiprocessor (SMP) system or other configuration including a plurality of processors 302 and 302A connected to system bus 304. Alternatively, a single processor 302 may be employed. Also connected to system bus 304 is memory controller/cache 306, which provides an interface to local memory 308. An I/O bridge 310 is connected to the system bus 304 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to execute any aspect of the present invention, for example, to implement aspects of any of the methods and/or system components illustrated in FIGS. 1-6. Moreover, the computer usable program code may be utilized to implement the preservation of information as set forth more fully herein.

The data processing system depicted in FIG. 7 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A computer-implemented method of preserving the state of network-accessible information, and conveying notifications of changes to said network accessible information, the method comprising:
receiving, by a computer server providing a preservation and notification service, a preservation request from a requesting client machine, the preservation request comprising an indication of a portion of information addressed by a uniform resource locator that defines relevant content for preservation;
in response to receiving the preservation request, obtaining, by the computer server, a copy of the portion of the information addressed by the uniform resource locator that defines relevant content for preservation;
storing, by the computer server, the obtained copy of the defined relevant content in a manner that associates the stored content with the preservation request;
after obtaining the copy, monitoring, by the computer server, the information addressed by the uniform resource locator for changes to the portion of the information addressed by the uniform resource locator that defines the relevant content;
based on the monitored information, identifying, by the computer server, whether the portion of the information addressed by the uniform resource locator that defines the relevant content has changed since obtaining the copy of the portion of the information addressed by the uniform resource locator that defines the relevant content; and
when the computer-server has identified that the portion of the information addressed by the uniform resource locator has changed, conveying, by the computer server, a notification to the requesting client machine that a change to the portion of the information addressed by the uniform resource locator that defines the relevant content has been identified.

2. The method according to claim 1, wherein the preservation request is communicated in response to identifying either manually by a user, or automatically by an electronic process, a reference to the uniform resource locator in an electronic file.

3. The method of claim 2, wherein:
receiving the preservation request further comprises:
the receiving with the preservation request, contact information associated with the preservation request; and
the storing the obtained copy of the relevant content includes storing the obtained copy of the relevant content to create a pre-modified copy of the relevant content in a manner that associates the stored content with the identified contact information.

4. The method according to claim 2, wherein:
receiving the preservation request comprises:
receiving a programmatically generated message from a corresponding application that is associated with the electronic file that contains the recognized uniform resource locator.

5. The method according to claim 1, comprising:
recognizing a reference to the uniform resource locator in an electronic file by scanning electronic files on at least one of a user processing device or at least one network accessible storage location to identify files containing uniform resource locators that address content for preservation.

6. The method according to claim 1, wherein receiving the preservation request comprises:
implementing, by the computer server, at least one predefined rule or policy to distinguish relevant content from a remainder of content associated with the uniform resource locator.

7. The method according to claim 1, wherein monitoring the information for changes to the relevant content comprises at least one of polling or subscribing to changes to the corresponding content associated with the uniform resource locator.

8. The method according to claim 1 further comprising:
establishing, by the computer server, at least one policy that sets an expiration after which no additional monitoring for changes to the relevant content will be conducted.

9. The method according to claim 8, wherein at least one policy that sets an expiration after which no additional monitoring for changes to the relevant content will be conducted is based upon at least one characteristic of an email application, at least one characteristic of a word processing application or at least one characteristic of a presentation application.

10. The method according to claim 1, wherein conveying an indication when a change has been detected to the relevant content of the uniform resource locator comprises:
providing at least one of the copy of the obtained relevant content or a location where the relevant content can be retrieved from a storage location.

11. The method according to claim 1, further comprising:
storing the copy of the relevant content obtained thus preserving the state of the relevant content as pre-modified content;
wherein:
identifying whether the relevant content of the recognized uniform resource locator has changed since receiving the corresponding preservation request comprises:
detecting that a user is attempting to access the recognized uniform resource locator; and
conveying an indication when a change has been detected to the relevant content of the recognized uniform resource locator comprises:
providing the user with an option of retrieving the stored version of the recognized uniform resource locator or loading a current version of information at the recognized uniform resource locator.

12. The method according to claim 2 comprising:
recognizing the reference to the uniform resource locator in the electronic file by a preservation client that is installed on a user processing device.

13. The method according to claim 2, comprising:
recognizing, by the computer server, the reference to the uniform resource locator in the electronic file; and
further comprising providing a client that is installed on a user processing device,
wherein the client is configured for identifying references to uniform resource locators in electronic files associated with the user processing device and for performing at least one of formatting preservation requests or sending preservation requests to the preservation service for recognition of the preservation request by the preservation service.

14. A computer-implemented method of preserving the state of referenced network-accessible information and conveying selected information to a user, comprising:
executing a client application on a user processing device for:
identifying, by the user processing device, at least one uniform resource locator referenced in an electronic file, the electronic file associated with a user processing device application other than the client application, where each identified uniform resource locator identifies a location of associated content that is desired to be preserved by a user;
obtaining, by the user processing device, from a respective content server, a current copy of the content associated with each identified uniform resource locator;
storing, by the user processing device, local to the user processing device, the obtained copy of the content as an archive version;
detecting, by the user processing device, that the user is attempting to access content associated with the identified uniform resource locator;
determining, by the user processing device, whether content associated with the identified uniform resource locator has been stored as an archive version; and
providing, by the user processing device, the user an option to view either the archived version of the content or a current copy of the content at the recognized uniform resource locator;
in response to providing the user the option, receiving, by the user processing device, selection input from the user, the selection input indicating selection by the user of one of the archived version or the current copy; and
conveying, by the user processing device, the selected one of the archived version or the current copy to the user.

15. The method according to claim 14, wherein the client is further configured for:
scanning by the client, electronic files on the client computer system to identify uniform resource locators in predefined document types.

16. The method according to claim 14, wherein the client is further configured for:
enabling the user to manually engage the client to obtain the content associated with at least one recognized uniform resource locator.

17. The method according to claim 14, wherein the client is further configured for:
enabling a hook into at least one of an email application, a word processing application or a presentation application to identify uniform resource locators to be preserved.

18. A computer program product for preserving the state of network-accessible information, and conveying notifications of changes to said network accessible information, the method comprising:
a non-transitory computer usable medium having computer usable program code embodied therewith, the computer usable program code comprising:
computer usable program code configured to execute on a computer processing device to recognize a reference to a uniform resource locator in an electronic file where the uniform resource locator provides an address for relevant content to be preserved;
computer usable program code configured to execute on the computer processing device to receive, from a requesting client, an indication of a portion of information addressed by the uniform resource locator that defines the relevant content to be preserved;
computer usable program code configured to execute on the computer processing device to obtain a copy the relevant content;
computer usable program code configured to execute on the computer processing device to store the obtained copy of the relevant content in a manner that associates the stored content with the preservation request;
computer usable program code configured to monitor the information addressed by the uniform resource locator for changes to the portion of the information addressed by the uniform resource locator that defines the relevant content;

computer usable program code configured to execute on the computer processing device to identify, based on the monitored information, whether the portion of the information addressed by the uniform resource locator that defines the relevant content of the recognized uniform resource locator has changed since obtaining the copy the portion of the information addressed by the uniform resource locator that defines of the relevant content; and computer usable program code configured to execute on the computer processing device when the computer-server has identified that the portion of the information addressed by the uniform resource locator has changed, to convey, to the requesting client, a notification that a change to the portion of the information addressed by the uniform resource locator that defines the relevant content has been identified.

* * * * *